(12) United States Patent
Koester

(10) Patent No.: US 7,077,384 B2
(45) Date of Patent: Jul. 18, 2006

(54) INTEGRATED POST-GUIDED SEAT RING ASSEMBLY

(75) Inventor: David John Koester, Gladbrook, IA (US)

(73) Assignee: Fisher Controls International LLC., St. Louis, MO (US)

( * ) Notice: Subject to any disclaimer, the term of this patent is extended or adjusted under 35 U.S.C. 154(b) by 49 days.

(21) Appl. No.: 10/756,920

(22) Filed: Jan. 13, 2004

(65) Prior Publication Data

US 2005/0151109 A1   Jul. 14, 2005

(51) Int. Cl.
*F16K 1/42* (2006.01)
(52) U.S. Cl. ...................... 251/363; 251/360
(58) Field of Classification Search ............... 251/319, 251/360, 363
See application file for complete search history.

(56) References Cited

U.S. PATENT DOCUMENTS

| | | | | |
|---|---|---|---|---|
| 807,476 | A * | 12/1905 | Leidecker | 251/82 |
| 828,216 | A * | 8/1906 | Kieren | 251/318 |
| 1,542,612 | A * | 6/1925 | Collar | 137/243.2 |
| 1,706,123 | A | 3/1929 | McBride | |
| 1,908,440 | A * | 5/1933 | Milton | 251/275 |
| 3,762,685 | A | 10/1973 | Curran | |
| 4,041,973 | A | 8/1977 | Rice et al. | |
| 4,542,879 | A | 9/1985 | Stein | |
| 5,763,814 | A * | 6/1998 | Avory et al. | 102/202.7 |

OTHER PUBLICATIONS

Copy of International Search Report for International Patent Application No. PCT/US04/040601, dated Apr. 5, 2005, 8 pages.
Copy of Written Opinion for International Patent Application No. PCT/US04/040601, dated Apr. 5, 2005, 6 pages.
"Design EB Specifications C & D Valve Bodies (Obsolete Product)," Fisher-Rosemount, Nov. 1998.
"Class 125 through 600 Design ES and EAS easy-e® Valves," Instruction Manual Form 5030, Fisher-Rosemount, Jan. 2001.
"Design EZ easy-e® Control Valve," Instruction Manual, Form 5118, Emerson Process Management, Nov. 2001.
"Design ET and EAT easy-e® Valves Class 125 through 600," Instruction Manual, Form 5081, Emerson Process Management, Jun. 2002.

(Continued)

*Primary Examiner*—Edward K. Look
*Assistant Examiner*—John K. Fristoe, Jr.
(74) *Attorney, Agent, or Firm*—Marshall, Gerstein & Borun LLP

(57) ABSTRACT

A control valve having a seat ring assembly constructed from a unitary piece of material is disclosed. The seat ring assembly may include a base which serves as a valve seat for the valve plug of the valve, and which includes a plurality of exterior threads adapted to rotatably attach to a plurality of interior threads provided within the valve body. The seat ring assembly may also include a post-guided bearing surface to maintain alignment of the valve plug to the valve seat. The seat ring assembly can be secured to the valve body simply by threadably attaching the elements. Moreover, by providing the valve seat and the guide surface as integral parts of the seat ring assembly, manufacturing costs and maintenance requirements are reduced and subsequent seal leak performance is increased.

14 Claims, 1 Drawing Sheet

OTHER PUBLICATIONS

"Design EZ easy-e® Control Valve," Instruction Manual, Emerson Process Management, Jul. 2002.

"Bulletin 51.1:EB(10)," p. 3, Fisher Controls, no date given.

* cited by examiner

INTEGRATED POST-GUIDED SEAT RING ASSEMBLY

FIELD OF THE DISCLOSURE

The disclosure generally relates to valves and, more particularly, relates to sliding stem control valves with screwed-in seat rings.

BACKGROUND OF THE DISCLOSURE

Sliding stem control valves are commonly used to control fluid flow within process control loops. As known to those of ordinary skill in the art, a sliding stem control valve modulates fluid flow through a valve body by using an actuator, coupled through a bonnet assembly, to move a control element or valve plug in a reciprocal motion relative to a valve seat. The seat ring provides an annular surface within the valve body against which the valve plug engages to close off the valve when desired. Two important features of a sliding stem control valve are that it must control or modulate the fluid in a predetermined manner, including providing tight shut off when closed, and it must be capable of withstanding the pressure and temperature influences of the process.

Additionally, conventional sliding stem control valves provide some form of guiding to align the valve plug and the valve seat. One type of guiding known to those skilled in the art is provided by a bushing or guide surface positioned within the bonnet assembly. A reduced diameter of the valve plug bears upon a bushing mounted inside a journal in the bonnet assembly. This type of guiding is known as post guiding. As known to those of ordinary skill in the art, standard manufacturing tolerances and conventional assembly procedures can produce a misalignment of the centerline of the valve seat relative to the valve plug guiding. This misalignment or offset in concentricity does not allow the valve plug to properly seat within the valve seat, thus providing a substantial leak path between the valve plug and seat during shut off or valve closure. In certain applications, the concentricity problem will reduce shut-off performance and may create high velocity flows that erode the valve seat further degrading valve performance.

Another typical type of guiding, also known to those skilled in the art as post guiding, is where the valve plug is guided by the valve trim (i.e. the internal valve components exposed to the process). Generally, a seat ring retainer provides an internal guiding surface within the fluid flow path on which the valve plug moves throughout its full stroke. In such a valve construction, a separate seat ring retainer and seat ring are typically clamped in place between the valve body and bonnet. A gasket, such as a spiral-wound gasket, is generally provided between the bonnet and the seat ring retainer in conventional clamped-trim designs. As known to those skilled in the art, the clamped trim provides an engineered, pre-loaded force to compress the spiral-wound gasket. Under compression, the spiral-wound gasket provides an opposing spring force that creates a seal between the seat ring retainer and the bonnet and the seat ring and the body. These designs are susceptible to seal failures as described in greater detail below. Those skilled in the art recognize three specific problems associated with conventional gaskets or seals.

First, sliding stem control valves are frequently used in process applications encountering temperatures in excess of 300 degrees Fahrenheit and pressure drops exceeding 150 psi. These extreme operating conditions create valve assembly leakage problems due to differences in the thermal expansion of the materials of construction. By using different materials of construction, valve manufacturers can increase performance and/or decrease cost of the valve assembly. For example, general process applications may employ a control valve having a steel body and stainless steel seat ring retainer. As is known, the steel valve body has dissimilar thermal expansion characteristics of the stainless steel seat ring retainer. Thus, an increase in operating temperature may subsequently increase the pre-load force such that the spiral-wound gasket is overstressed or yields resulting in permanent deformation. When the temperatures return to ambient conditions, the gasket cannot return to its pre-stressed condition and a leak path is created. Alternatively, if a valve body is constructed of a material that expands more than the seat ring retainer material, an increase in operating temperature may cause a corresponding decrease in the pre-load force on the spiral wound gasket causing a leak between the seat ring and the valve body.

Second, conventional sliding stem valves that utilize spiral-wound gaskets are subject to pressure limitations. The compliant nature of the spiral-wound gasket creates a robust seal for numerous applications, but as those skilled in the art recognize, these gasket are limited in the pressure drop or differential pressure that can be accommodated without losing seal integrity. For example, if the spiral-wound gasket in an unbalanced control valve is able to maintain adequate trim clamping force up to a pressure limit of 300 psi, any differential pressure exceeding that pressure limit may temporarily deform the gasket and subsequently creating a leak path.

Third, leaks are addressed in conventional clamped-design sliding stem control valve assemblies by applying tremendous loading in the bonnet bolting. As known to those of ordinary skill in the art, increasing the bonnet bolting loading increases control valve cost by requiring heavier structures within the valve body and bonnet to withstand the increased loading as well as requiring larger bonnet bolting to apply the loads.

It can therefore be seen that a need exists for an improved seat ring assembly for a sliding stem control valve which is manufactured from fewer pieces, and which can be assembled and maintained in position with less hardware and structure than is currently demanded.

SUMMARY OF THE DISCLOSURE

In accordance with one aspect of the disclosure, a control valve is disclosed which may comprise a valve body, a valve plug, a valve stem, and an integrated post-guided seat ring assembly. The valve body may include an inlet, an outlet, and a chamber between the inlet and outlet. The valve plug is slidably disposed in the seat ring assembly with the valve stem being connected to the valve plug. The seat ring assembly is disposed in the chamber. The seat ring assembly is threadably fastened to the valve body.

In accordance with another aspect of the disclosure, a method of assembling a control valve is disclosed which may comprise inserting a seat ring assembly with integral post guiding into a control valve body, threadably attaching the seat ring assembly to the control valve body and securing a bonnet assembly to the control valve body.

These and other aspects and features of the disclosure will become more readily apparent upon reading the following detailed description when taken in conjunction with the accompanying drawings.

Figure 1:
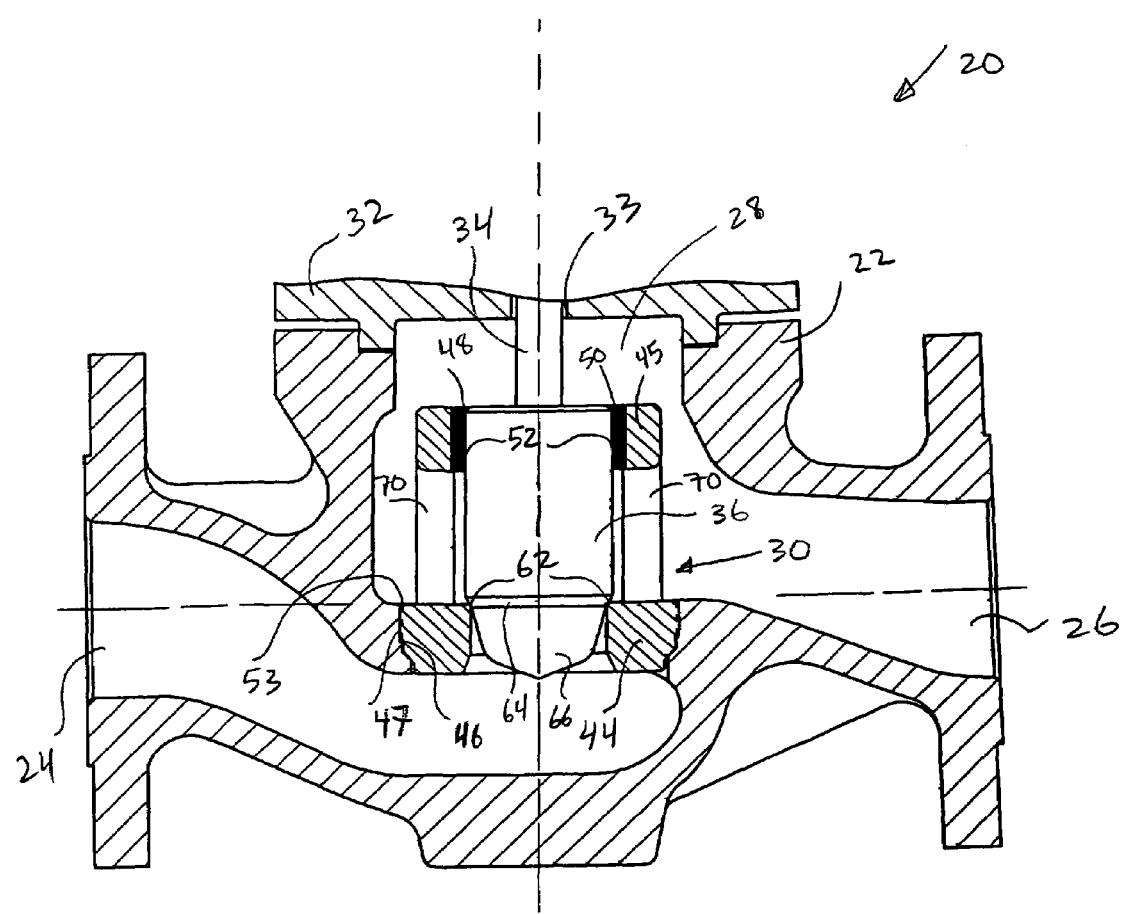
FIG. 1 is a sectional view of a post guided, unbalanced sliding stem control valve constructed in accordance with the teachings of the disclosure.

While the disclosure is susceptible to various modifications and alternative constructions, certain illustrative embodiments thereof have been shown in the drawings and will be described below in detail. It should be understood, however, that there is no intention to limit the disclosure to the specific form disclosed, but on the contrary, the intention is to cover all modifications, alternative constructions, and equivalents falling within the spirit and scope of the invention as defined by the appending claims.

DETAILED DESCRIPTION OF THE DISCLOSURE

Referring now to FIG. 1, a sliding stem control valve constructed in accordance with the teachings of the disclosure is generally referred to by reference numeral 20. It is to be understood that "sliding stem control valve" is used herein as encompassing any control valve, wherein a valve plug mounted to a reciprocating stem linearly translates or reciprocates relative to a valve seat mounted within a valve body between an inlet and an outlet of the body. Furthermore, one of ordinary skill in the art will readily recognize that a sliding stem control valve can encompass a variety of control valves, such as, globe valves or angle-style valves.

The disclosed example is described in the context of an unbalanced control valve. It is understood that unbalanced globe valves are those wherein a sliding control element, i.e., valve plug, does not allow for fluid communication through the control element. As a result, a significant pressure differential may exist on opposite sides of the control element, thereby necessitating relatively high actuation forces. A post-guided, unbalanced control valve 20 is shown to include a valve body 22 defining an inlet 24 and an outlet 26. A chamber 28 is provided between the inlet 24 and outlet 26 and houses a seat ring assembly 30. A bonnet assembly 32 is secured to the valve body 22 proximate the chamber 28 and provides an opening 33 for receipt of a valve stem 34 connecting a valve plug 36 to an actuator (not shown). Packing (not shown) is provided within the bonnet 32 and around the valve stem 34 to provide for adequate sealing therebetween.

The bonnet assembly 32 is secured to the valve body 22 by a plurality of fasteners (not shown). The seat ring assembly 30 is shown to be substantially cylindrical in shape, and to be manufactured from a unitary piece of material, which may be provided in the form of cast steel, stainless steel or the like. Alternatively, seat ring assembly 30 is not limited solely to a cylindrical shape as long as the seat ring assembly 30 can be physically accommodated by the internal volume of the control valve 20. A base 44 of the seat ring assembly 30 includes a plurality of threads 46 used to threadably attach the seat ring assembly 30 to the valve body 22. More specifically, the valve body 22 includes a plurality of threads 47 at a passageway 53 at the base of the chamber 28. Accordingly, the seat ring assembly 30 is physically attached to the valve body 22 by threadably attaching the seat ring assembly 30 to the valve body 22 by rotation thereof.

An interior diameter of a guide portion 45 of the seat ring assembly 30 that extends above the base 44 is substantially greater than the exterior diameter of the valve plug 36. Accordingly, the valve plug 36 engages the guide portion 45 at an upper rim 48. This can be accomplished either by providing the upper rim 48 with a reduced diameter section using the base metal as a bushing, or more efficiently, by providing a separate element such as a bushing 50, as shown, to provide a direct engagement and alignment of the valve plug 36. In the present embodiment, the bushing 50 can be frictionally held within the upper rim 48 or attached by a variety of methods known to one with ordinary skill in the art. The bushing 50 provides an interior surface 52 as a bearing and guide surface facilitating such sliding. The interior surface 52 of the bushing 50 is nominally 0.010 inches larger in diameter than the valve plug 36 to facilitate assembly, yet constrained enough to provide guiding during operation. The base 44 of the seat ring assembly 30 provides a valve seat 62 for engagement with a chamfered circumferential surface 64 of the valve plug 36. In addition, it will be noted that the valve plug 36 includes a nose section 66 having a predetermined shape tailored to provide for the desired flow characteristics of the control valve 20. Movement of the actuator (not shown) causes movement of the valve stem 34, which in turn causes movement of the valve plug 36 relative to the valve seat 62. The relative movement of the valve plug 36 with respect to the valve 62 accordingly provides an opening or closing of the control valve 20.

Within the seat ring assembly 30, proximate the valve seat 62, one or more apertures 70 may be provided. In FIG. 1, two apertures 70 are shown. As understood by those skilled in the art, the aperture 70 may have any variety of forms and shapes so long as flow is not impeded through the control valve 20. For example, as shown in FIG. 1, the aperture 70 may be provided in the form of a rectangular opening extended between the base 44 and the upper rim 48. Alternatively, a number of holes (not shown) may be provided in the seat ring assembly 30.

As previously described, conventional unbalanced control valves with clamped trim parts (i.e., valve components other than the valve body and the bonnet) use force from body-to-bonnet bolting to provide loading to a spiral-wound gasket to in turn clamp the trim parts together. The spiral-wound gasket acts as a spring. Because the spiral-wound gasket is used as a spring, temperature and pressure differential capabilities of the valve are limited. The temperature limits are due to differential thermal expansion between the valve body and the trim parts. In other words, the trim parts can expand more or less than the valve body, which can over-or under-compress the spiral-wound gasket if temperature limits are exceeded. The pressure differential limits are typically due to pressure acting upward on the trim parts, which also can over-compress the spiral-wound gasket and cause leakage.

Other unbalanced control valves known to the art have a separate guide bushing in the bonnet and an individual seat ring assembly to obviate the above-described clamped trim/spiral-would gasket issues. However, such valves are susceptible to concentricity problems. In other words, alignment of the seating surfaces on the valve plug and seat ring is affected by many machining concentricity tolerances in the body, seat ring, bonnet, guide bushing, and valve plug. The loss of concentricity between the valve components does not permit the valve plug to completely engage the valve seat. This in turn can substantially reduce the control valve performance at shut off or when the control valve is closed or cause valve seat erosion due to the high velocity flows created with incomplete shut-off. In the disclosed control valve 20, the seat ring assembly 30, which includes the valve seat 62, the bushing 50 and the base 44, is a single component and may be constructed from the same material such as S31600 SST. Accordingly the disclosed control valve 20 is less prone to problems associated with temperature and pressure fluctuations.

Alternatively, the bushing 50 can be constructed from a material with greater wear resistance such as CoCr-A alloy or SI 7400 SST to substantially decrease maintenance and wear of the bushing 50 during operation. Furthermore, it can be seen that the seat ring assembly 30 not only provides for alignment of the valve plug, but provides sealing between the inlet 24 and outlet 26 without the use of a flat sheet gasket or spiral-wound gasket, or other sealing mechanism. By threadably attaching the seat ring assembly 30 to the valve body 22 and engaging the valve plug 36 against the valve seat 62 under sufficient pressure, an adequate seal between the inlet 24 and outlet 26 is achieved without the use of any form of gasket or other form of sealant. Moreover, by threadably attaching the seat ring assembly 30 to the valve body 22, and by avoiding the use of any form of gasket or sealant, the bonnet 32 can be manufactured from significantly less structure and be attached to the valve body 22 under significantly less tension and still provide for the proper operation and sealing of the valve 20.

As discussed above, this is in opposition to prior art valves that use gaskets, which only operate properly when sufficiently compressed by the bonnet assembly. Accordingly in prior art valves, the bonnet assembly and the fasteners or bolts used to connect the bonnet assembly to the housing, needed to be sized to withstand the significant force required to provide adequate compression of the sealing elements during operation of the valve. The prior art designs do not address the previously described thermal expansion issues and/or operational pressure limitations. Accordingly, the operation and sealing capability of the prior art valve may be effected. The present integrated post-guided seat ring assembly is substantially unaffected by variations in thermal conditions and does not have the pressure limitations of conventional spiral-wound gasket designs. Through the use of the teachings of the present disclosure, such additional elements are removed thereby, making the valve more applicable to such wide temperature ranges.

In operation, it can therefore be seen that a valve constructed in accordance with the teachings of the disclosure can be easily constructed simply be threadably attaching a seat ring assembly to a plurality of interior threads provided within the body of the valve. Manufacture and maintenance of such valves is thereby greatly enhanced in that the number of parts is greatly reduced and the forces needed to secure the bonnet to the valve body are also greatly reduced.

From the foregoing, one of ordinary skill in the art will readily appreciate that the teachings of the disclosure can be used to construct an unbalanced, post-guided valve having a seat ring assembly which is threadably attached to the body of the valve. In so doing, not only is sealing capability achieved, but production costs, as well as maintenance requirements are greatly reduced.

What is claimed is:

1. A control valve having a valve body and an inlet, an outlet, and a chamber between the inlet and the outlet, the control valve comprising;
   a shiftable valve plug mounted within the valve body for sliding movement and having a valve stem;
   a seat ring assembly comprising a substantially cylindrical unitary body, the seat ring assembly disposed within the chamber and having a base defining a valve seat sized to receive the valve plug, a threaded connection joining the base to the valve body such that the seat ring assembly is secured in place exclusively by the threaded connection, the seat ring assembly further including a guide portion spaced away from the base and a bore extending between the base and the guide portion;
   a bushing disposed adjacent the guide portion, the bushing sized to guide a portion of the valve plug, the bushing and the valve plug sized to maintain the valve plug substantially concentric with the valve seat.

2. The control valve of claim 1, wherein the control valve is unbalanced.

3. The control valve of claim 1, wherein the seat ring assembly is fastened to the valve body without any gasket therebetween.

4. The control valve of claim 1, wherein the seat ring assembly includes a wall extending between the base and the guide portion and having at least one aperture.

5. The control valve of claim 1, wherein the seat ring assembly includes a wall extending between the base and the guide portions and having a plurality apertures oriented in a predetermined pattern.

6. The control valve of claim 5, wherein at least some of the plurality of apertures include a predetermined shape.

7. The control valve of claim 5, wherein at least some of the plurality of apertures are drilled holes defining a smooth aperture.

8. The control valve of claim 1, wherein the valve plug includes an elongated cylindrical portion having a chamfered circumferential surface sized to engage the valve seat and a nose section, the cylindrical portion sized to engage both the guide portion and the valve seat at the same time when the chamfered circumferential surface is engaging the valve seat, the nose section shaped so as to provide desired flow characteristics.

9. The control valve of claim 1, wherein the guide portion includes a bushing, the bushing sized to engage the valve plug.

10. A seat ring assembly for a valve having a throttling element disposed within a valve body, the assembly comprising:
    a substantially cylindrical unitary housing having a first end, a second end, and a central bore extending along a longitudinal axis from the first end to the second end and sized to receive the throttling element; the housing including a wall having at least one aperture;
    the first end of the housing having a section of a reduced interior diameter sized to slidingly engage and guide an exterior surface of the throttling element; and
    the bore forming a valve seat disposed along the axis and adjacent the second end of the housing, the valve seat sized to sealingly engage the throttling element;
    the second end of the housing including threads sized to engage an interior threaded portion of the valve body, the housing secured within the valve body exclusively by a threaded connection formed between the threads and the threaded portion.

11. The seat ring assembly of claim 10, wherein the reduced diameter section of the first end is formed by positioning a bushing within the first end.

12. A method of assembling a control valve, comprising:
    inserting a unitary post-guided seat ring assembly into a control valve body, the seat ring assembly having a first end defining a reduced diameter section sized to engage and guide an exterior surface of a throttling element and a second end having a valve seat sized to sealingly engage the throttling element and a threaded exterior surface;

securing the post-guided seat ring assembly within the control valve body exclusively by threadably attaching the second end of the integrated post-guided seat ring assembly to the control valve body; and securing a bonnet assembly to the control valve body.

13. The method of claim 12, including forming the seat ring assembly to provide an outer structure, the outer structure surrounding a hollow, the hollow extending from the first end to the second end.

14. The method of claim 12, including providing a bushing adjacent the second end, the bushing sized to engage the valve plug.

* * * * *

UNITED STATES PATENT AND TRADEMARK OFFICE
CERTIFICATE OF CORRECTION

| | | |
|---|---|---|
| PATENT NO. | : 7,077,384 B2 | Page 1 of 1 |
| APPLICATION NO. | : 10/756920 | |
| DATED | : July 18, 2006 | |
| INVENTOR(S) | : David J. Koester | |

It is certified that error appears in the above-identified patent and that said Letters Patent is hereby corrected as shown below:

On the First Page:

At line (73), "LLC." should be -- LLC --.

In the Specification:

At Column 2, line 24, "gasket" should be -- gaskets --.

At Column 2, line 30, "creating" should be -- create --.

At Column 4, line 46, "over-or under-compress" should be -- over- or under-compress --.

At Column 4, line 54, "spiral-would" should be -- spiral-wound --.

At Column 5, line 6, "SI 7400" should be -- S17400 --.

In the Claims:

At Column 6, line 20, "plurality apertures" should be -- plurality of apertures --.

Signed and Sealed this

Fifteenth Day of May, 2007

JON W. DUDAS
*Director of the United States Patent and Trademark Office*